(12) United States Patent
Troy et al.

(10) Patent No.: US 8,510,039 B1
(45) Date of Patent: Aug. 13, 2013

(54) METHODS AND APPARATUS FOR THREE-DIMENSIONAL LOCALIZATION AND MAPPING

(75) Inventors: James J. Troy, Issaquah, WA (US); Charles A. Erignac, Kirkland, WA (US); Paul Murray, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 375 days.

(21) Appl. No.: 12/898,412

(22) Filed: Oct. 5, 2010

(51) Int. Cl.
*G01S 1/24* (2006.01)
(52) U.S. Cl.
USPC .......................................................... 701/436
(58) Field of Classification Search
None
See application file for complete search history.

(56) References Cited

U.S. PATENT DOCUMENTS

| | | | |
|---|---|---|---|
| 6,917,893 B2 | 7/2005 | Dietsch et al. | |
| 2007/0026872 A1* | 2/2007 | Fiegert et al. | 455/456.1 |
| 2010/0074473 A1 | 3/2010 | Kotaba | |
| 2010/0248745 A1* | 9/2010 | Ozawa et al. | 455/456.3 |
| 2011/0106427 A1* | 5/2011 | Kim et al. | 701/201 |
| 2011/0310087 A1* | 12/2011 | Wright et al. | 345/419 |

FOREIGN PATENT DOCUMENTS

EP 2166375 A2 3/2010

OTHER PUBLICATIONS

Cui, et al., 3D Shape Scanning with a Time-of-Flight Camera, 8 Pages.

* cited by examiner

*Primary Examiner* — Thomas Tarcza
*Assistant Examiner* — Adam Alharbi
(74) *Attorney, Agent, or Firm* — Armstrong Teasdale, LLP

(57) ABSTRACT

A system configured to enable three-dimensional localization and mapping is provided. The system includes a mobile device and a computing device. The mobile device includes an inertial measurement unit and a three-dimensional image capture device. The computing device includes a processor programmed to receive a first set of inertial measurement information from the inertial measurement unit, determine a first current position and orientation of the mobile device based on a defined position and orientation of the mobile device and the first set of inertial measurement information, receive three-dimensional image data of the environment from the three-dimensional image capture device, determine a second current position and orientation of the mobile device based on the received three-dimensional image data and the first current position and orientation of the mobile device, and generate a three-dimensional representation of an environment with respect to the second current position and orientation of the mobile device.

20 Claims, 3 Drawing Sheets

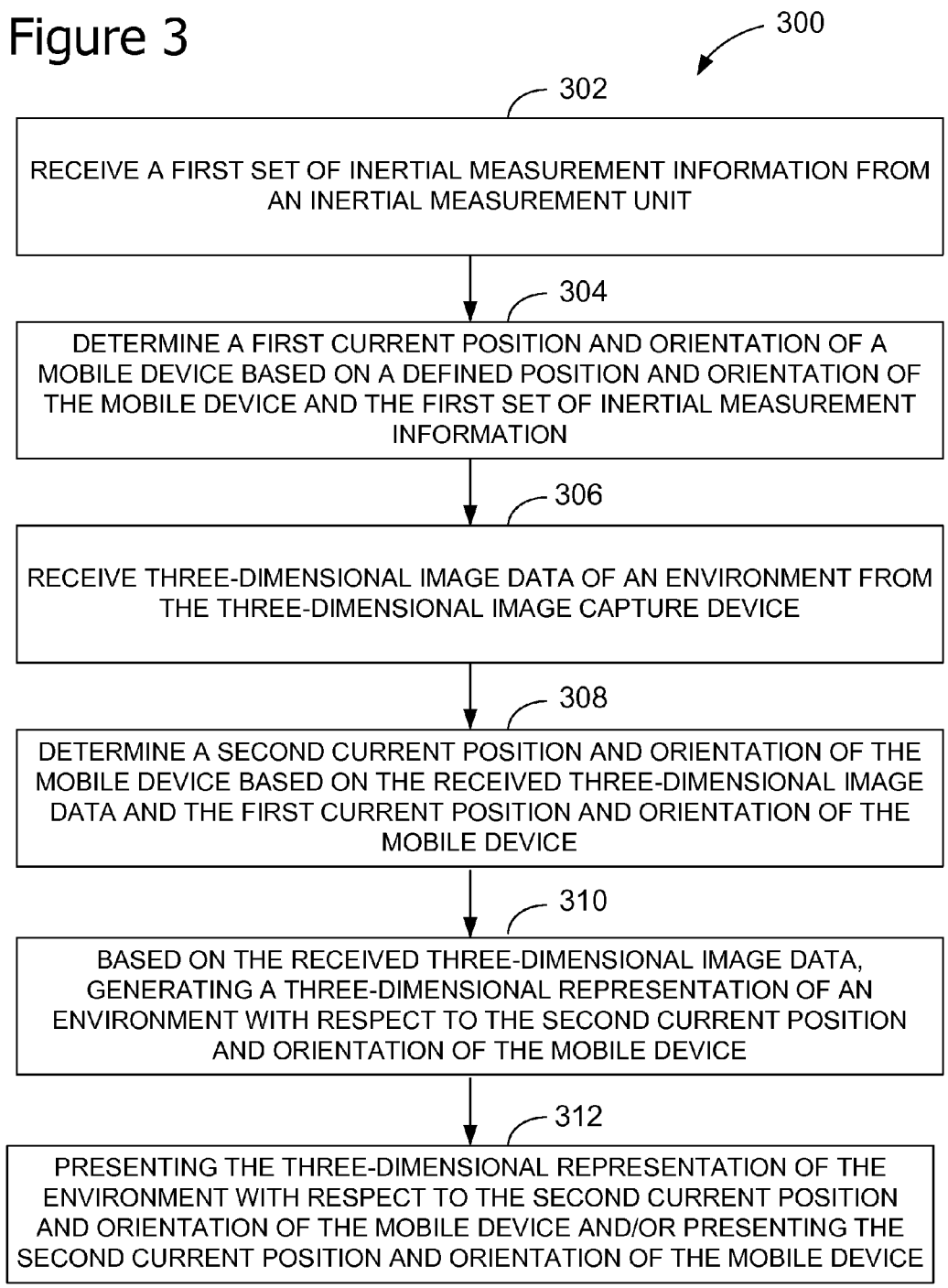

METHODS AND APPARATUS FOR THREE-DIMENSIONAL LOCALIZATION AND MAPPING

BACKGROUND

The present disclosure relates generally to a mobile device configured to enable three-dimensional localization and mapping, and more specifically, to a mobile device configured to autonomously enable simultaneous localization and mapping.

For robotic navigation and interaction with real-world environments, it is important to have an accurate map of an environment in which a robot is traveling, as well as accurate position and orientation information of the robot relative to the environment. Conventional systems require external hardware, such as fixed-position laser trackers, motion capture cameras, or markers placed on a surface in order to acquire three-dimensional scan data. Conventional systems cannot register movement of a scanning unit into a three-dimensional common global reference frame without an external source of position and orientation data for the scanner. Further, in order to perform self-localization or object scanning in an unprepared environment, conventional systems require an external tracking system, which can be very expensive and time consuming to set up, or require a laborious task of placing dozens of reflective markers on the surfaces of all of the objects being scanned.

SUMMARY

In one aspect, a system configured to enable three-dimensional localization and mapping is provided. The system includes a mobile device and a computing device. The mobile device includes an inertial measurement unit and a three-dimensional image capture device. The computing device includes a processor programmed to receive a first set of inertial measurement information from the inertial measurement unit, determine a first current position and orientation of the mobile device based on a defined position and orientation of the mobile device and the first set of inertial measurement information, receive three-dimensional image data of the environment from the three-dimensional image capture device, determine a second current position and orientation of the mobile device based on the received three-dimensional image data and the first current position and orientation of the mobile device, and generate a three-dimensional representation of an environment with respect to the second current position and orientation of the mobile device.

In another aspect, a method is provided. The method includes receiving a first set of inertial measurement information from the inertial measurement unit, determining a first current position and orientation of the mobile device based on a defined position and orientation of the mobile device and the first set of inertial measurement information, receiving three-dimensional image data of the environment from the three-dimensional image capture device, determining a second current position and orientation of the mobile device based on the received three-dimensional image data and the first current position and orientation of the mobile device, and generating a three-dimensional representation of an environment with respect to the second current position and orientation of the mobile device.

In yet another aspect, one or more computer-readable media having computer-executable component are provided. The components include an interface component that when executed by at least one processor causes the at least one processor to receive a first set of inertial measurement information from an inertial measurement unit, and receive three-dimensional image data of an environment from a three-dimensional image capture device, a localization component that when executed by at least one processor causes the at least one processor to determine a first current position and orientation of the device in the environment based on a defined position and orientation of the device and the first set of inertial measurement information, determine a second current position and orientation of the device based on the received three-dimensional image data and the first current position and orientation of the mobile device, and a mapping component that when executed by at least one processor causes the at least one processor to generate a three-dimensional representation of the environment with respect to the second current position and orientation of the device.

BRIEF DESCRIPTION OF THE DRAWINGS

The present disclosure is described in detail below with reference to the attached drawing figures.

FIG. 3 is an exemplary flow chart illustrating a process for three-dimensional localization and mapping.

DETAILED DESCRIPTION

The ability to determine a position and orientation of an object within the object's environment (e.g., localization) enables applications involving navigation for both autonomous robotic tasks as well as human-based tasks. Enabling a system to be self-contained (e.g., external components or signals are not needed) enables applications to be used in any type of unknown environment without additional services present, such as a global positioning system (GPS) or any other tracking system.

Localization is one of the key problems in autonomous robot navigation. In order to efficiently move through an environment, instead of blindly bumping into objects, an autonomous robotic vehicle (and software that runs it) requires an ability to construct a three-dimensional map of the robotic vehicle's environment and determine a position and orientation of the robotic vehicle within that environment in real-time, with low levels of uncertainty.

In human-based tasks, an ability to accurately determine position and orientation relative to an environment from a mobile device enables applications for the capture of volumetric data, as well as real-time six degrees-of-freedom measurements. For these tasks, a self contained mobile device would be the most useful.

Related to a capture of three-dimensional environment data for mapping purposes, a scanning of objects with a portable, lightweight, self-contained mobile device would also be useful for robotic and human-based applications. In the area of autonomous identification of objects, it is often necessary to have access to a three-dimensional representation of an object instead of relying on two-dimensional image data. For manufacturing and inspection of physical objects it would be advantageous to be able to capture a current or "as-built" state of an object for further analysis. An ability to quickly perform this task with a self-contained, handheld unit, enables efficient use of a technician's time.

The methods and apparatus described herein use a combination of one or more inertial sensors and optical sensors, including, for example, an inertial measurement unit (IMU)

and a three-dimensional depth camera, along with analysis software, to determine position and orientation information (e.g., using numerical integration) of the mobile device as well as constructing a three-dimensional representation of an environment and/or a three-dimensional representation of objects within an environment. In one embodiment, the apparatus describe herein are configured to perform localization within an environment in real-time. Further, the methods and apparatus described herein provide real-time self-localization and three-dimensional object scanning in a mobile device that does not require an external laser, external tracking hardware, or placement of markers on a target.

Figure 1:
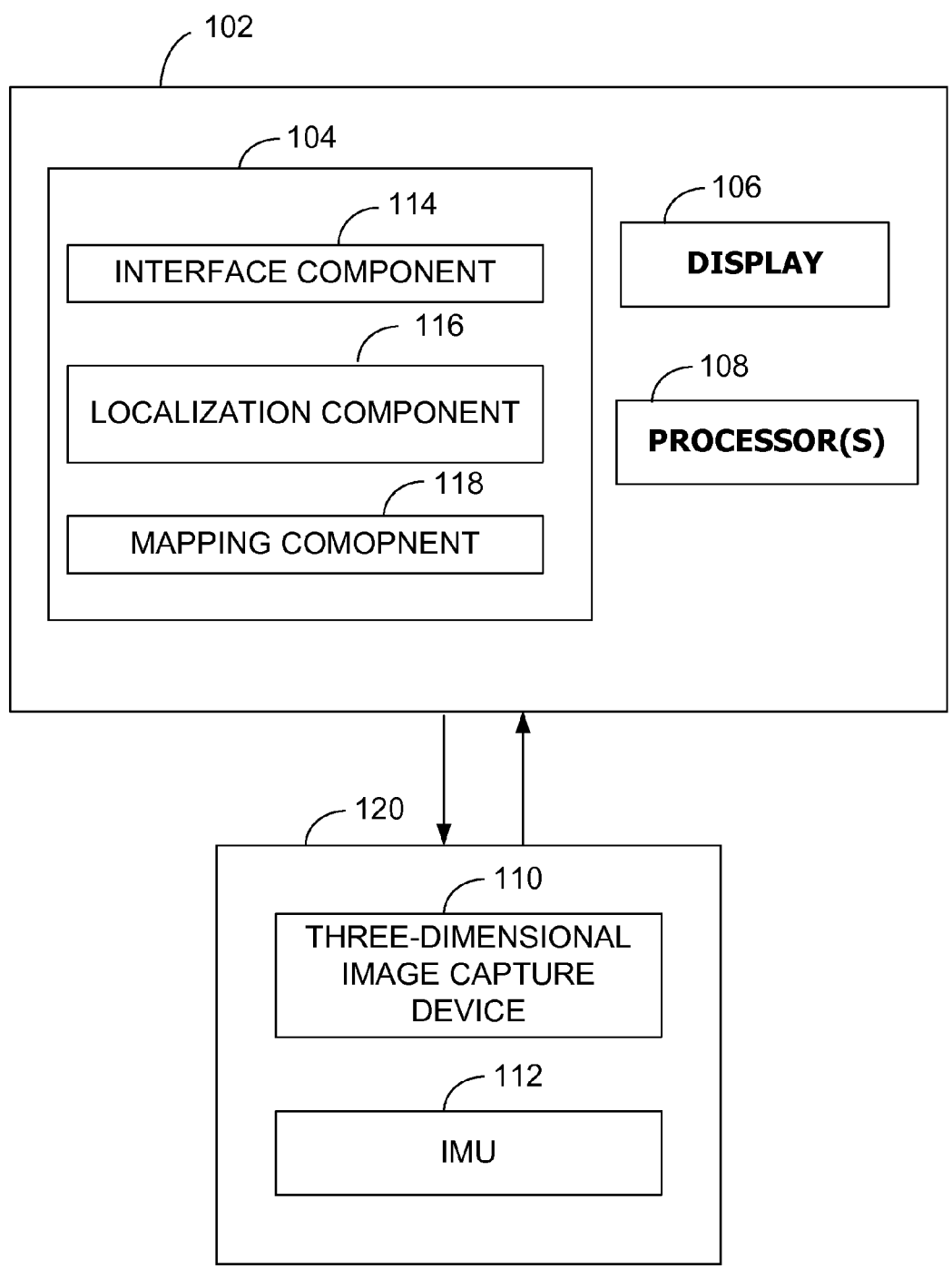
FIGS. 1 and 2 are exemplary block diagrams of a system that includes a mobile device and a computing device that enable three-dimensional localization and mapping.
Figure 2:
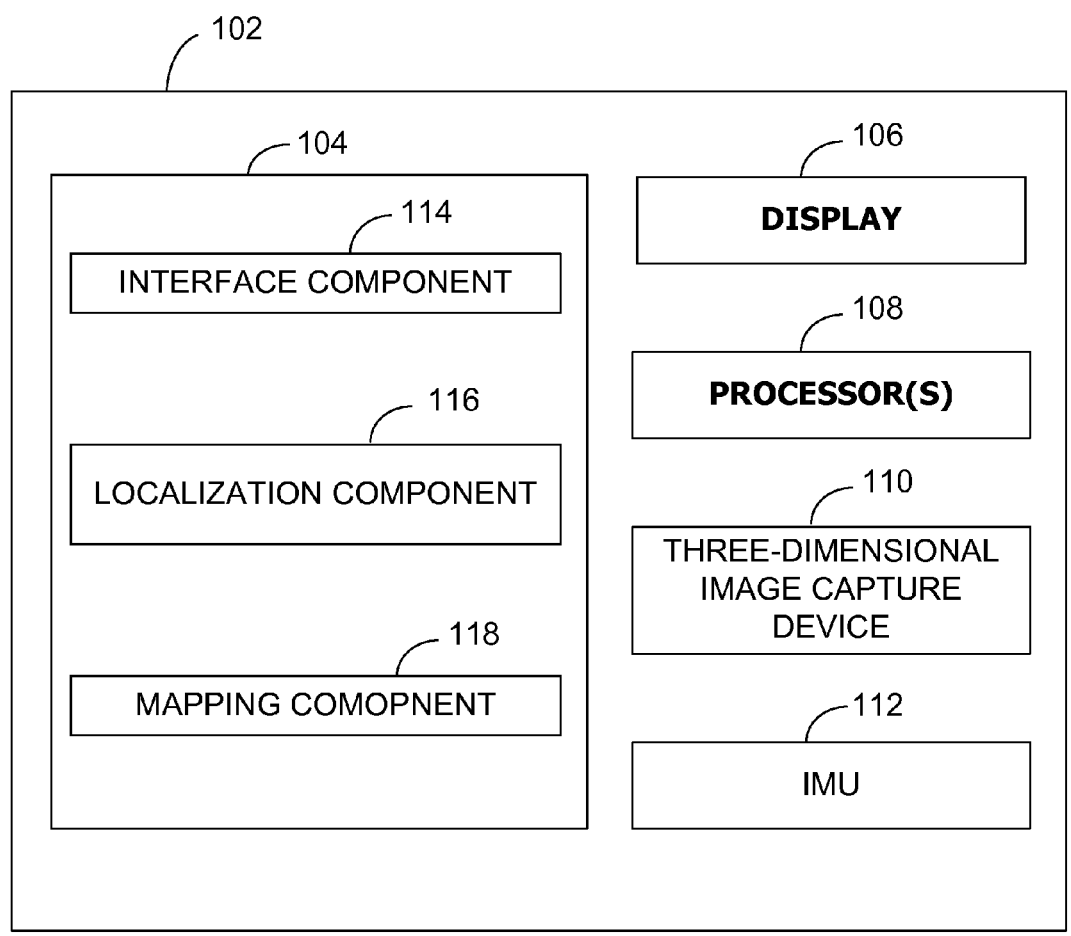

Referring now to FIG. 1, an exemplary block diagram illustrates a system 100 having a computing device 102 and a mobile device 120. In the embodiment shown in FIG. 1, mobile device 120 includes a three-dimensional image capture device 110 and an IMU 112 that are each in communication with computing device 102. Computing device 102 includes a memory area 104, a display 106, and at least one processor 108 and mobile device 120 includes an optical sensor (e.g., three-dimensional image capture device 110), and an inertia sensor (e.g., IMU 112). One of ordinary skill in the art, guided by the teaching herein, will appreciate that, each of three-dimensional image capture device 110 and IMU 112 may be separate from computing device 102 (as shown in FIG. 1) or integrated into computing device 102 (as shown in FIG. 2). In addition, display 106 may be a display device separate from computing device 102 and/or mobile device 120. In one embodiment, display 106 is a display integrated into computing device 102, for example, a capacitive touch screen display, or a non-capacitive display. User input functionality may also be provided in display 106, where display 106 acts as a user input selection device such as in a touch screen. Three-dimensional image capture device 110 is configured to measure depth by calculating a distance from three-dimensional image capture device 110 to a point in an environment, and is further configured to collect three-dimensional points (e.g., a point cloud) that provide a representation of an object or space. IMU 112 is configured to measure relative position and orientation of mobile device 120.

While the embodiments described herein are directed to calculating a position and orientation of mobile device 120 that is separate from computing device 102, as mentioned above, three-dimensional image capture device 110 and IMU 112 may be separate from or integrated within computing device 102.

By itself, three-dimensional image capture device 110 may have a difficult time correctly placing points captured while moving into a common reference system. Three-dimensional image capture device 110 may only capture X, Y, Z positions relative to itself. When three-dimensional image capture device 110 moves, it can be difficult for three-dimensional image capture device 110 to determine how much three-dimensional image capture device 110 has moved. Utilizing simultaneous localization and mapping (SLAM), a position and orientation of mobile device 120 can be determined via three-dimensional image capture device 110, IMU 112, and simultaneous localization and mapping (SLAM).

For example, using an IMU (e.g., IMU 112) enables an ability to numerically integrate linear accelerometer data and gyro data to compute an estimate of a position of a device (e.g., mobile device 120) and an orientation of a device. However, a concern with IMU devices is numerical drift. However, using SLAM, one can use depth measurements of three-dimensional image capture device 110 and/or visual features detected in an image of three-dimensional image capture device 110. Depth-based SLAM utilizes point clouds produced by three-dimensional image capture device 110 to correlate a position within a three-dimensional map/environment. Visual SLAM (VSLAM) utilizes common features in a series of two-dimensional images captured from an image capture device (e.g., three-dimensional image capture device 110 without a depth component) to determine a motion of three-dimensional image capture device 110. In one embodiment, loop-closure techniques are used to improve accuracy of these methods. To overcome any difficulties capturing common features between frames, for example, if three-dimensional image capture device 110 is moved too fast or there is a lack of features in an area being covered, IMU 112 is utilized to "fill in" these gaps.

When each of IMU 112 and SLAM/VSLAM are combined, the strengths of each overcome weaknesses of the other to provide robust six degrees-of-freedom tracking for a scan registration process. IMU 112 provides accurate relative motion tracking for short time intervals, and SLAM based on range data (point clouds) and/or visual data is capable of computing position fixes when three-dimensional image capture device 110 points towards an area of an environment that has already been surveyed. Therefore, utilizing SLAM/VSLAM, a position and orientation determined by IMU 112 can be reset/corrected even if three-dimensional image capture device 110 is temporarily pointed away from the surveyed area of the environment. On the other hand, SLAM/VSLAM algorithms can run slowly relatively to a sampling rate of IMU 112. Therefore, IMU 112 can produce accurate position and orientation estimates between SLAM/VSLAM position and orientation updates.

Memory area 104 stores one or more computer-executable components. Exemplary modules include, but are not limited to an interface module 114, a localization component 116, and a mapping component 118. While the components are shown to be stored in memory area 104, the components may be stored and executed from a memory area remote from computing device 102. For example, although system 100 is configured to be autonomous, in some embodiments, the components of computing device 102 may be stored in a cloud service, a database, or other memory area accessible by computing device 102. Such embodiments can reduce the computational and storage burden on computing device 102.

Processor 108 executes computer-executable instructions for implementing aspects of the disclosure. In some embodiments, processor 108 is transformed into a special purpose microprocessor by executing computer-executable instructions or by otherwise being programmed. For example, interface module 114, when executed by processor 108, causes processor 108 to receive a first set of inertial measurement information from IMU 112, and receive three-dimensional image data of an environment from three-dimensional image capture device 110. Localization component 116, when executed by processor 108, causes processor 108 to determine a first current position and orientation of mobile device 120 in the environment based on a defined position and orientation of mobile device 120 and the first set of inertial measurement information. Localization component 116 further causes processor 108 to determine a second current position and orientation of mobile device 120 based on the received three-dimensional image data and the first current position and orientation of mobile device 120. Mapping component 118, when executed by processor 108, causes processor 108 to generate, based on the second current position and orientation of mobile device 120, a three-dimensional representation of the environment with respect to the second current position and orientation of mobile device 120.

Referring next to FIG. 3, an exemplary flow chart illustrating a process 300 for simultaneous three-dimensional localization and mapping is shown. Process 300 begins at 302 where a first set of inertial measurement information is received from IMU 112. In one embodiment, the first set of inertial measurement information includes accelerometer data and gyro data. Thus, a position and orientation of mobile device 120 can be calculated based on the accelerometer data and the gyro data. At 304, a first current position and orientation of mobile device 120 in an environment is determined based on a defined position and orientation of mobile device 120 and the first set of inertial measurement information by IMU 112. At 306, three-dimensional image data of the environment is received from three-dimensional image capture device 110. At 308, a second current position and orientation of mobile device 120 is determined based on the received three-dimensional image data and the first current position and orientation of mobile device 120. At 310, a three-dimensional representation of the environment is generated with respect to the second current position and orientation of mobile device 120 based on the second current position and orientation of mobile device 120. At 312, at least one of the three-dimensional representation of the environment with respect to the second current position and orientation of the mobile device 120 is presented to a user or the second current position and orientation of mobile device 120 is presented to a user on, for example, display device 106. In one embodiment, process 300 is repeated to enable continuous measurement of position and orientation of mobile device 120. In other embodiments only the computed position and orientation data is used, without generating a three-dimensional model of the environment.

Exemplary Operating Environment

A computer or mobile device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The mobile device may operate in a networked environment using logical connections to one or more remote computers, such as a remote computer. Although described in connection with an exemplary computing system environment, embodiments of the disclosure are operational with numerous other general purpose or special purpose computing system environments or configurations.

The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system configured to enable three-dimensional localization and mapping;
the system comprising:
a mobile device comprising:
an inertial measurement unit; and
a three-dimensional image capture device; and
a computing device comprising a processor programmed to:
receive a first set of inertial measurement information from the inertial measurement unit;
determine a first current position and orientation of the mobile device based on a defined position and orientation of the mobile device and the first set of inertial measurement information;

receive three-dimensional image data of the environment from the three-dimensional image capture device;

determine a second current position and orientation of the mobile device based on the received three-dimensional image data and the first current position and orientation of the mobile device; and generate a three-dimensional representation of an environment with respect to the second current position and orientation of the mobile device.

2. A system in accordance with claim 1, further comprising a display device.

3. A system in accordance with claim 2, wherein the processor is further programmed to present the three-dimensional representation of the environment on the display device.

4. A system in accordance with claim 1, wherein the processor is further programmed to receive accelerometer data and gyro data from the inertial measurement unit; and based on the accelerometer data and the gyro data, determine a position and an orientation of the mobile device.

5. A system in accordance with claim 1, wherein the three-dimensional image capture device is a depth camera.

6. A system in accordance with claim 5, wherein the three-dimensional image data comprises a distance from the three-dimensional image capture device to a point in the environment.

7. A system in accordance with claim 6, wherein the three-dimensional image data comprises a collection of three-dimensional points.

8. A system in accordance with claim 7, further comprising generate a shape of an object in the environment based on the collection of three-dimensional points.

9. A system in accordance with claim 8, further comprising generating a three-dimensional representation of the object based on the generated shape.

10. A method for enabling three-dimensional localization and mapping via a mobile device comprising an inertial measurement unit and a three-dimensional image capture device, the method comprising:

receiving a first set of inertial measurement information from the inertial measurement unit;

determining a first current position and orientation of the mobile device based on a defined position and orientation of the mobile device and the first set of inertial measurement information;

receiving three-dimensional image data of the environment from the three-dimensional image capture device;

determining a second current position and orientation of the mobile device based on the received three-dimensional image data and the first current position and orientation of the mobile device; and generating a three-dimensional representation of an environment with respect to the second current position and orientation of the mobile device.

11. A method in accordance with claim 10, further comprising:

receiving accelerometer data and gyro data from the inertial measurement unit; and based on the accelerometer data and the gyro data, determining a position and orientation of the mobile device.

12. A method in accordance with claim 10, wherein the three-dimensional image data comprises a distance from the three-dimensional image capture device to a point in the environment.

13. A method in accordance with claim 12, wherein the three-dimensional image data comprises a collection of three-dimensional points.

14. A method in accordance with claim 13, further comprising generating a shape of an object in the environment based on the collection of three-dimensional points.

15. One or more computer-readable media having computer-executable component, the components comprising:

an interface component that when executed by at least one processor causes the at least one processor to receive a first set of inertial measurement information from an inertial measurement unit, and receive three-dimensional image data of an environment from a three-dimensional image capture device;

a localization component that when executed by at least one processor causes the at least one processor to determine a first current position and orientation of the device in the environment based on a defined position and orientation of the device and the first set of inertial measurement information, determine a second current position and orientation of the device based on the received three-dimensional image data and the first current position and orientation of the mobile device; and a mapping component that when executed by at least one processor causes the at least one processor to generate a three-dimensional representation of the environment with respect to the second current position and orientation of the device.

16. A computer-readable medium in accordance with claim 15, wherein the interface component further causes the processor to receive accelerometer data and gyro data from the inertial measurement unit, and wherein the localization component further causes the processor to determine a position and an orientation of the device based on the accelerometer data and the gyro data.

17. A computer-readable medium in accordance with claim 15, wherein the three-dimensional image data comprises a distance from the three-dimensional image capture device to a point in the environment.

18. A computer-readable medium in accordance with claim 17, wherein the three-dimensional image data comprises a collection of three-dimensional points.

19. A computer-readable medium in accordance with claim 18, wherein the mapping component further causes the processor to generate a shape of an object in the environment based on the collection of three-dimensional points.

20. A computer-readable medium in accordance with claim 19, wherein the mapping component further causes the processor to generate a three-dimensional representation of the object based on the generated shape of the object.

* * * * *